(12) United States Patent
Nomura et al.

(10) Patent No.: US 7,990,813 B2
(45) Date of Patent: Aug. 2, 2011

(54) OPTICAL PICKUP DEVICE

(75) Inventors: Rika Nomura, Yokohama (JP); Kazumi Takahashi, Toyokawa (JP); Seiichi Kato, Tsuchiura (JP); Yasushi Kinoshita, Yokohama (JP); Kazuhiro Todori, Yokohama (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 65 days.

(21) Appl. No.: 12/620,626

(22) Filed: Nov. 18, 2009

(65) Prior Publication Data

US 2010/0243873 A1    Sep. 30, 2010

(30) Foreign Application Priority Data

Mar. 25, 2009   (JP) .................................. 2009-073096

(51) Int. Cl.
*G11B 7/00*    (2006.01)

(52) U.S. Cl. .................... 369/44.15; 369/44.12; 369/269
(58) Field of Classification Search ............... 369/44.12, 369/44.15, 44.11, 269, 75.11, 112.24; 720/721
See application file for complete search history.

(56) References Cited

U.S. PATENT DOCUMENTS

| 7,317,271 | B2 * | 1/2008 | Obata et al. ..................... 310/90 |
| 2003/0031114 | A1 * | 2/2003 | Noda et al. ..................... 369/269 |
| 2006/0198279 | A1 * | 9/2006 | Kurogama et al. ...... 369/112.24 |
| 2007/0091739 | A1 * | 4/2007 | Aso et al. ..................... 369/44.15 |
| 2007/0147217 | A1 * | 6/2007 | Haruguchi et al. ...... 369/112.01 |
| 2008/0056104 | A1 * | 3/2008 | Nishimura et al. ........... 369/269 |
| 2008/0056105 | A1 * | 3/2008 | Aiello ........................... 369/269 |

FOREIGN PATENT DOCUMENTS

| JP | 11-176115 A | | 7/1999 |
| JP | 2008192216 A | * | 8/2008 |
| JP | 2009-4013 A | | 1/2009 |

* cited by examiner

*Primary Examiner* — Thuy N Pardo
(74) *Attorney, Agent, or Firm* — Mattingly & Malur, PC (57) ABSTRACT

An optical pickup device includes a hosing having three walls connected together whose horizontal cross-section is substantially U-shaped. A first wall supports one end of a shaft, a second wall facing the first wall supports the other end of the shaft and a third wall connects the first and second walls. A lubricant tray is surrounded by the three walls and the shaft. By the shaft being attached to an end side surface of the lubricant tray, the shaft can be integrally formed with the housing. A radius of curvature or an angle formed on a horizontal cross-section of the three walls is larger than a radius of curvature or an angle formed between one of the three walls and the lubricant tray.

17 Claims, 9 Drawing Sheets

VERTICALLY OPEN SPACE

OPTICAL PICKUP DEVICE

BACKGROUND OF THE INVENTION

1. Field of the Invention

The present invention relates to an optical pickup device for use in reading information from and writing information on such optical discs as CDs (Compact Discs), DVDs (Digital Versatile Discs), and BDs (Blu-ray Discs; registered trademark) or to an optical-disc drive apparatus with such an optical pickup device.

2. Description of the Related Art

Figure 2:
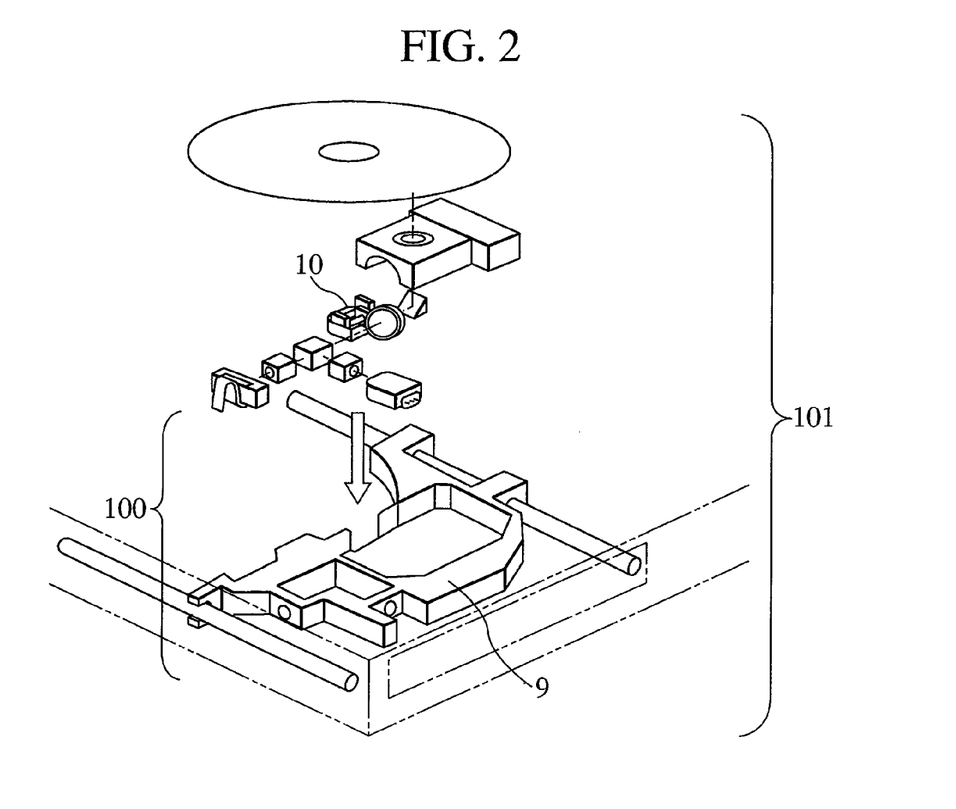
FIG. 2 is a perspective view of a conventional optical pickup device.

Conventional optical pickup devices or conventional optical-disc drive apparatuses with such optical pickup devices commonly employ such a structure as shown in FIG. 2. As illustrated in FIG. 2, the components of an optical system are glued to an optical pickup housing 9 that is made primarily of such a metal as Zn, Mg, and Al or PPS (polyphenylene sulfide) resin and shaped by die casting or molding.

Figure 3:
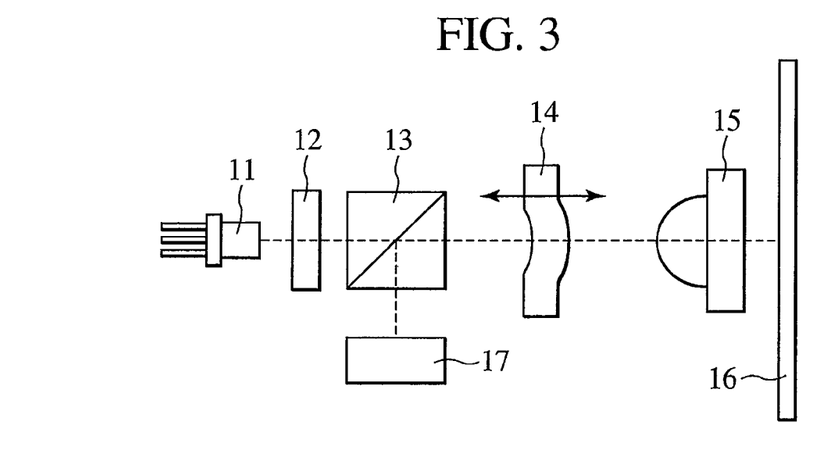
FIG. 3 is a diagram illustrating the optical path of an optical pickup device.

FIG. 3 illustrates the optical path of an optical pickup. Light emitted from a light-emitting element 11 such as a laser diode and the like is guided onto an objective lens 15 through optical components such as a lens 12, a prism 13, a mirror (not shown), and the like. After the objective lens 15 focuses the light onto an optical disc 16, reflected light from the optical disc 16 travels through optical components such as the objective lens 15, other lenses, a mirror, and the like to a photodiode 17, where the reflected light is converted into an electric signal.

Different optical recording medium, such as CDs, DVDs, and BDs, require different wavelengths of light sources, different light protective-layer thicknesses, and different numerical apertures (NA) of objective lenses. For this reason, an optical pickup device requires, in addition to an objective lens, a correcting mechanism for spherical aberration so that the optical pickup device can handle optical discs of various formats.

Specifically, correction of spherical aberration requires a movable lens 14 to be placed between the objective lens 15 and the prism 13 as shown in FIG. 3 and also requires the use of a lens mover 10 as shown in FIG. 2 so that the position of the movable lens 14 can be finely adjusted in a direction of its optical axis.

Figure 4:
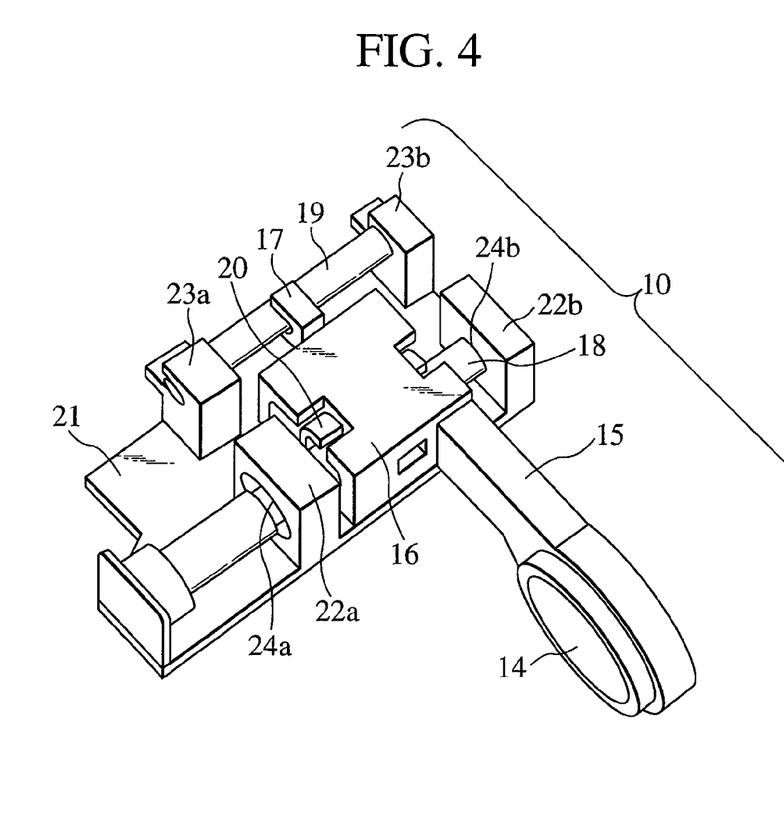
FIG. 4 is a diagram illustrating a conventional lens mover.

The lens mover 10 employs such a structure as disclosed in JP-2009-4013-A (Patent Document 1). FIG. 4 also illustrates in perspective the lens mover 10 that moves the movable lens 14.

As shown in FIG. 4, the movable lens 14 is secured to one end of a lens support member 15 that is formed of synthetic resin whose coefficient of friction is low (i.e., abrasion-resistant). A frame 16 is integrally formed with the lens support member 15. The frame 16 is located at the middle section of the lens support member 15 and hollow in a direction of the optical axis of the movable lens 14. The proximal-end side of the frame 16 which is located opposite the movable lens 14 is provided with an auxiliary-shaft holding member 17. The auxiliary-shaft holding member 17 has a U-shaped vertical cross-section and is formed integrally with the frame 16.

A drive shaft 18 is inserted into the frame 16 so as to penetrate the frame 16, and an auxiliary shaft 19 is inserted into the U-shaped portion of the auxiliary-shaft holding member 17 in a slidable manner. The drive shaft 18 and the auxiliary shaft 19 are arranged parallel to each other. The lens support member 15 and the movable lens 14 are jointly moved by the drive shaft 18 and the auxiliary shaft 19 in a direction of the optical axis of the movable lens 14.

Provided inside the frame 16 are, in addition to the drive shaft 18, a press member 20 and a spring. The spring is inserted between the press member 20 and an inner side wall of the frame 16. The press member 20 presses the drive shaft 18 with the aid of the spring to such an extent that the frame 16 can slide on the drive shaft 18.

A pair of drive-shaft support walls 22a and 22b is arranged on a base member 21 so as to face each other with a given space provided therebetween. Likewise, a pair of auxiliary-shaft support walls 23a and 23b is arranged on the base member 21 so as to face each other with a given space provided therebetween. One end and the other end of the drive shaft 18 are loosely supported by a guide hole 24a of the drive-shaft support wall 22a and by a guide hole 24b of the drive-shaft support wall 22b, respectively, such that the drive shaft 18 can slide in its shaft-extending direction. In contrast, one end and the other end of the auxiliary shaft 19 are secured to the auxiliary-shaft support walls 23a and 23b, respectively.

For the purpose of increasing the slidability of the shaft contact portions of the auxiliary-shaft holding member 17, the press member 20 and the like with respect to the drive shaft 18 and the auxiliary shaft 19, a lubricant is often applied to the drive shaft 18 and the auxiliary shaft 19. A typically used lubricant is grease or oil made primarily from olefin-based synthetic oil, fluorine resin, silicone resin, or the like.

Although applying such a lubricant to the shafts 18 and 19 enhances the slidability of the movable lens 14, the operation of the lens mover 10 often results in that lubricant being scattered, being attached to the housing walls of the lens mover 10, or being spilled out, which may contaminate other optical components.

JP-11-176115-A (Patent Document 2) discloses a structure that prevents lubricant from being scattered while a lens mover of an optical pickup device is in operation.

SUMMARY OF THE INVENTION

Conventionally, the lens mover 10 used to correct spherical aberration is assembled separately from the optical pickup 100 of FIG. 2 and thereafter mounted on the optical pickup 100. In order to further downsize the optical pickup 100 and reduce its manufacturing costs, however, it would be more effective to integrally form the shafts of the lens mover 10 and the optical pickup housing 9 of FIG. 2 and to correct spherical aberration of the optical pickup 100. The above method enables downsizing and cost reduction of the optical pickup 100 because the base member 21 of the lens mover 10 can be eliminated.

When the shafts of the lens mover 10 and the housing 9 are integrally formed, however, the sliding movements of the lens mover 10 may result in the lubricant applied to the shafts moving toward the walls of the lens mover 10, spilling out from the corners of the walls, and eventually contaminating other optical components located inside the housing 9.

Therefore, integrally forming the shafts of the lens mover 10 and the housing 9 necessitates a structure that prevents lubricant from moving up the walls of the lens mover 10, spilling out from the corners of the walls, and contaminating other optical components located inside the housing 9.

To achieve the above object, one aspect of the invention is an optical pickup device comprising: a housing; a light-emitting element that emits light; a light-receiving element that receives the light; a shaft to which a lubricant is applied; and an optical-component mounting member that is attached to the shaft in a movable manner and has an optical component (or a lens); wherein the housing includes: three walls connected together whose horizontal cross-section is substantially U-shaped, a first wall of the three walls supporting one end of the shaft, a second wall of the three walls facing the first wall and supporting the other end of the shaft, a third wall connecting the first wall and the second wall; and a retainer plate provided so as to be surrounded by the three walls and the shaft. By the shaft being attached to an end side surface of the retainer plate, the shaft can be integrally formed with the housing. Further, by making a radius of curvature on a horizontal cross-section of the three walls larger than a radius of curvature formed between one of the three walls and the retainer plate, the lubricant can be prevented from spilling out from the walls of the housing and retained on the retainer plate, which leads to achievement of the above object. Furthermore, by making an angle formed horizontally by two adjacent walls of the three walls larger than an angle formed by one of the three walls and the retainer plate, the same effect as above can be obtained, which also leads to achievement of the above object.

Therefore, the invention can provide a highly-reliable optical pickup device that prevents lubricant spillage and resultant contamination of optical components even when a drive shaft of a lens mover and the housing of the optical pickup device are integrally formed.

DESCRIPTION OF THE PREFERRED EMBODIMENTS

Embodiments according to the invention will now be described with reference to FIGS. 1 and 5 through 12. Optical components arranged on the optical path of an optical pickup device of the invention are made primarily from polyolefins or acrylic and shaped by molding. The housing of the optical pickup device that houses the optical components is made primarily from Zn, Mg, Al, or PPS (polyphenylene sulfide) and shaped by die casting or molding. Typically, a Blu-ray disc has multiple data layers, which are arranged in a thickness direction of the disc at given intervals; thus, spherical aberration results when the focus of a laser beam is moved from one data layer to another. For this reason, the optical pick device of the invention is provided with a lens mover to correct spherical aberration.

The embodiments of the invention are designed to prevent shaft lubricant from adhering to optical components when the lens mover is integrally formed with the housing of the optical pickup device in order to further downsize the optical pickup device and reduce its manufacturing costs.

Embodiment 1

Embodiment 1 is first described with reference to FIGS. 1 and 5 through 7.

Figure 1:
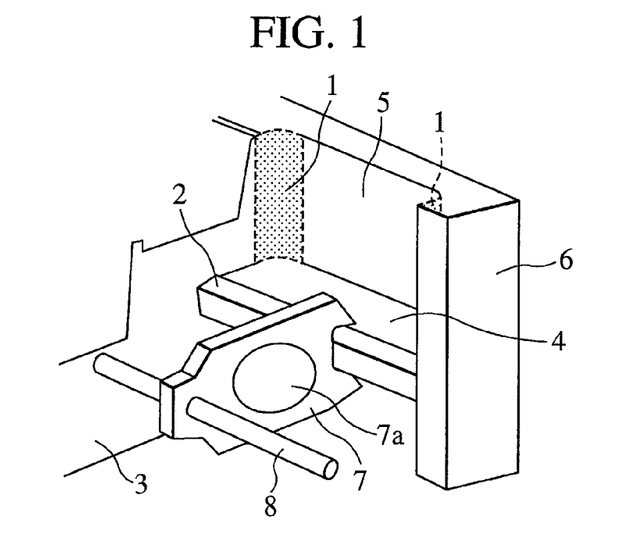
FIG. 1 is a perspective view of an optical pickup device according to an embodiment of the invention.

FIG. 1 illustrates an optical pickup device comprising an auxiliary shaft 2 to which a lubricant is applied; and an optical-component mounting member 7 having a lens (optical component) 7a. The housing of the optical pickup device includes a first flat wall 3 and a second flat wall 6. The first and second walls 3 and 6 face each other so that the first wall 3 supports one end of the auxiliary shaft 2 and the second wall 6 supports the other. The housing also includes a third flat wall 5 that connects the first and second walls 3 and 6. Thus, a horizontal cross-section of the housing is substantially U-shaped. The housing further includes a lubricant tray 4 that is surrounded by the first wall 3, the second wall 6, the third wall 5, and the auxiliary shaft 2. The auxiliary shaft 2 is attached to a side surface of the lubricant tray 4. While supporting the auxiliary shaft 2, the lubricant tray 4 receives lubricant spilled from the auxiliary shaft 2. The optical-component mounting member 7 can move on the auxiliary shaft 2; it can move up to the proximity of the first wall 3 and up to the proximity of the second wall 6. In Embodiment 1, the corner 1 formed by the first wall 3 and the third wall 5 and the corner 1 formed by the second wall 6 and the third wall 5 are both curved.

Figure 5A:
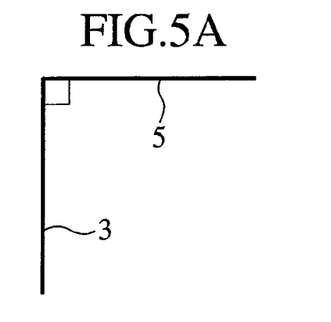
FIGS. 5A to 5F are diagrams illustrating Embodiment 1 of the invention.
Figure 5B:
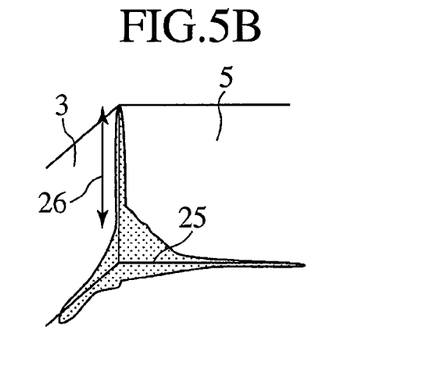

The structures of one of the corners 1 are described with reference to FIGS. 5 through 7. FIGS. 5A and 5B are a top view and a perspective view, respectively, illustrating one of the corners of a conventional pickup device.

When the auxiliary shaft 2 and the housing of an optical pickup device are integrally formed, the sliding movements of the optical-component mounting member 7 moves a lubricant 25 applied to the auxiliary shaft 2 toward the walls of the housing, and the lubricant 25 eventually accumulates at the corners of the housing. In the case of a conventional pickup device, the contamination of optical components by the lubricant 25 is caused by the oil components of the lubricant 25 moving up the corners of the housing due to capillary action. The capillary action refers to the upward movement of liquid through a capillary-like tube due to the high wettability of the inner wall of that tube. Because the angle of the corner of FIGS. 5A and 5B formed by the first wall 3 and the third wall 5 is small, making that corner act like a tube, that corner is subject to capillary action. In the structure of the corners 1 of Embodiment 1, in contrast, lubricant moves up only due to the wettability of the walls. In other words, lubricant moves up a shorter distance as the particular portions of the walls that are in contact with the lubricant have a smaller force to pull up the lubricant.

In FIGS. 5A and 5B, the corner formed by the first wall 3 and the third wall 5 has a smaller angle (i.e., 90 degrees) because they are perpendicular to each other. Thus, the lubricant 25 at the corner is in contact with and moves up both the first wall 3 and the third wall 5. Because the force to pull up the lubricant 25 exerts bi-directionally, that is, from the first wall 3 and from the third wall 5, the lubricant 25 moves up the corner more easily.

To prevent the lubricant 25 from moving up the corner, the force to pull up the lubricant 25 that exerts bi-directionally, that is, from the first wall 3 and from the third wall 5, needs to be dispersed. To do so, effective corner structures take the form of FIGS. 5C and 5D and FIGS. 5E and 5F.

Figure 5C:
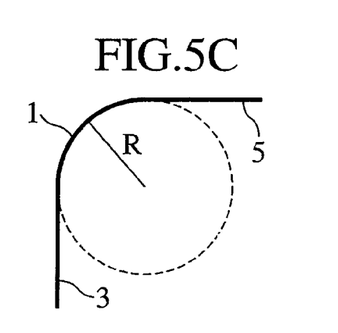
Figure 5D:
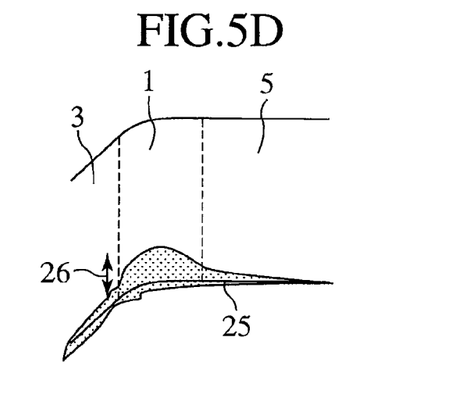

FIGS. 5C and 5D are a top view and a perspective view, respectively, illustrating one of the housing corners 1 when it is curved. FIG. 6 is test results illustrating the relationship between the curvature radius R at one of the housing corners 1 and the upward movement of lubricant (height). The tests were conducted on the following conditions: the housing was made from PPS; lubricants A, B, C, and D were used; and the amount of lubricant application was 0.4 mg. The test results revealed that when the curvature radius R was equal to or greater than 0.2 mm, lubricant upward movements could be almost prevented regardless of the types of lubricant. Therefore, it is desired that the curvature radii R at the corners 1 be equal to or greater than 0.2 mm.

It should be noted that upon manufacture of an optical pickup housing, the curvature radius R can accept a tolerance of ±0.1 mm. In light of the tolerance, therefore, the curvature radius R is also effective when it is equal to or greater than 0.1 mm.

Figure 5E:
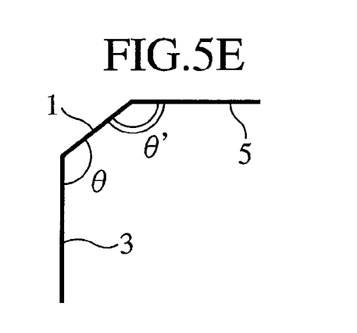
Figure 5F:
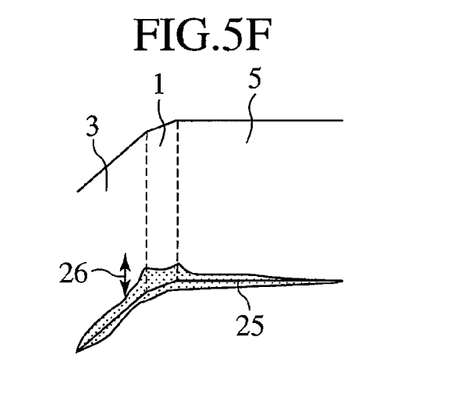

FIGS. 5E and 5F are a top view and a perspective view, respectively, illustrating the corner 1 formed by the first wall 3 and the third wall 5 when its inner angle is made larger than the inner angle formed by the lubricant tray 4 and the first wall 3 (or by the lubricant tray 4 and the third wall 5). By forming an additional wall between the first wall 3 and the third wall 5, the angle θ formed by the additional wall and the first wall 3 and the angle θ' formed by the additional wall and the third wall 5 are both equal to or more than 135 degrees.

Figure 6:
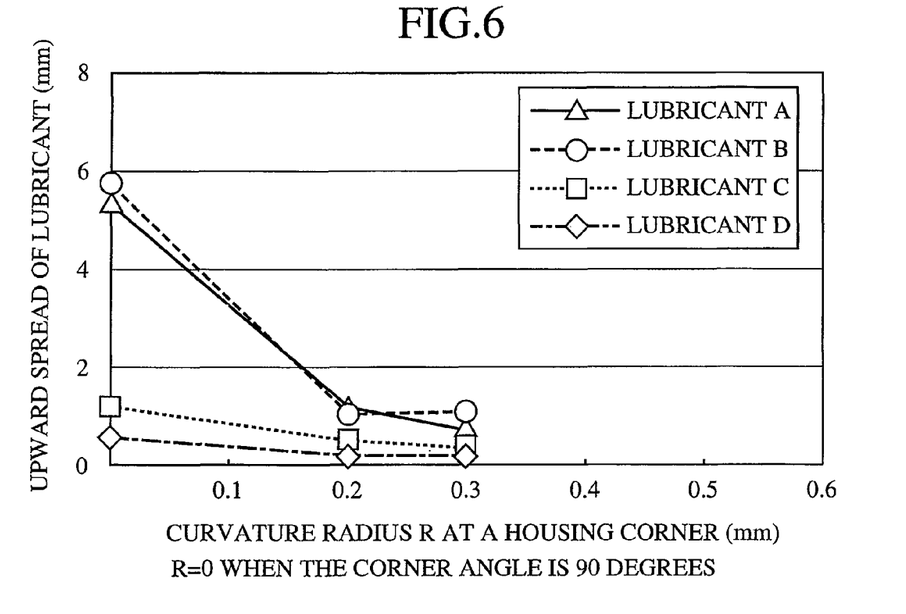
FIG. 6 is a graph illustrating the relationship between the curvature radius at a housing corner and the upward movement of lubricant according to Embodiment 1.
Figure 7:
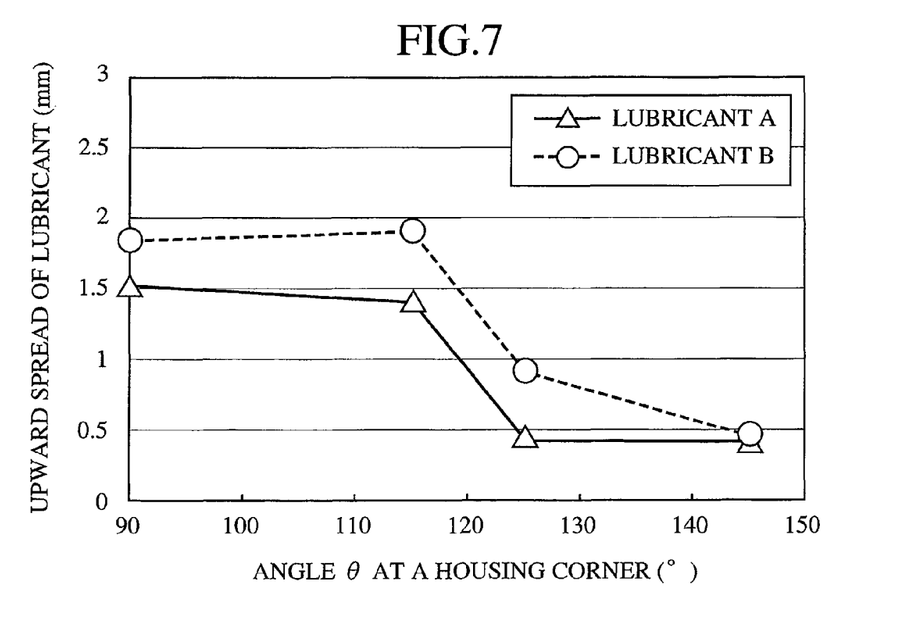
FIG. 7 is a graph illustrating the relationship between the inner angles at a housing corner and the upward movement of lubricant according to Embodiment 1.

FIG. 7 is test results illustrating the relationship between the angle θ at one of the housing corners 1 and the upward movement of lubricant (height). The tests were conducted on the following conditions: the housing was made from aluminum (Al); lubricants A and B were used; and the amount of lubricant application was 0.4 mg as in FIG. 6. The test results revealed that when the angle θ was equal to or greater than 125 degrees, lubricant upward movements could be almost prevented regardless of the types of lubricant. Therefore, it is desired that the angles θ and θ' at the corners 1 be equal to or greater than 125 degrees.

It should be noted that upon manufacture of an optical pickup housing, the angle θ can accept a tolerance of ±0.5 degrees. In light of the tolerance, therefore, the angle θ is also effective when it is equal to or greater than 120 degrees.

Note also that the lubricants A, B, C, and D used in the above tests were made primarily from olefin-based synthetic oil, and the tests were conducted after housings to which lubricant was applied were left untreated for ten minutes in an 85° C. atmosphere.

In FIGS. 5C to 5F, the curvature radius R or the angles θ and θ' between the first wall 3 and the third wall 5 are made larger. Although the curvature radius or the angle between the first wall 3 and the lubricant tray 4 or between the third wall 5 and the lubricant tray 4 is still small, this makes the lubricant tray 4 easily retain lubricant. The retention of lubricant by the lubricant tray 4 and the resultant surface tension of the lubricant prevent the lubricant from moving up the corners 1. In other words, by making the curvature radius between the first wall 3 and the third wall 5 (the curvature radius of the curved corner between the first wall 3 and the third wall 5, as shown in FIG. 5C) larger than the curvature radius between the first wall 3 and the lubricant tray 4 and the curvature radius between the third wall 5 and the lubricant tray 4, lubricant can be prevented from moving up the corner 1 between the first wall 3 and the third wall 5. Further, by making the inner angle formed by the first wall 3 and the third wall 5 larger than the inner angle between the first wall 3 and the lubricant tray 4 and the inner angle between the third wall 5 and the lubricant tray 4, lubricant can be prevented from moving up the corner 1 between the first wall 3 and the third wall 5.

By lubricant being prevented from moving up the corner 1 between the first wall 3 and the third wall 5, more of the lubricant accumulates at the boundary between the first wall 3 and the lubricant tray 4. Since one end of the boundary leads to the auxiliary shaft 2, the lubricant can return to the auxiliary shaft 2. More of the lubricant can return to the auxiliary shaft 2 if the lubricant is also prevented from moving from the lubricant tray 4 to the third wall 5 and forced to accumulate at the boundary between the first wall 3 and the lubricant tray 4. In other words, more lubricant can return to the auxiliary shaft 2 by making the curvature radius between the first wall 3 and the lubricant tray 4 smaller than the curvature radius between the first wall 3 and the third wall 5 and the curvature radius between the third wall 5 and the lubricant tray 4 (that is, by making a curvature radius at a location closer to the auxiliary shaft 2 smaller than a curvature radius at a location farther away from the auxiliary shaft 2). The above is also achieved by making the inner angle between the third wall 3 and the lubricant tray 4 smaller than the inner angle between the first wall 3 and the third wall 5 and the inner angle between the third wall 5 and the lubricant tray 4 (that is, by making an inner angle at a location closer to the auxiliary shaft 2 smaller than an inner angle at a location farther away from the auxiliary shaft 2).

Embodiment 2

Figure 8A:
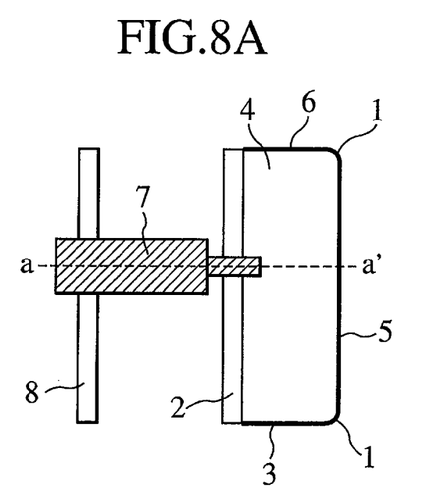
FIGS. 8A to 8D are diagrams illustrating Embodiment 2 of the invention.
Figure 8B:
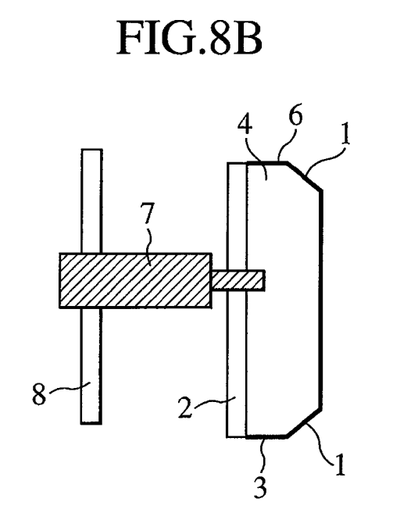
Figure 8C:
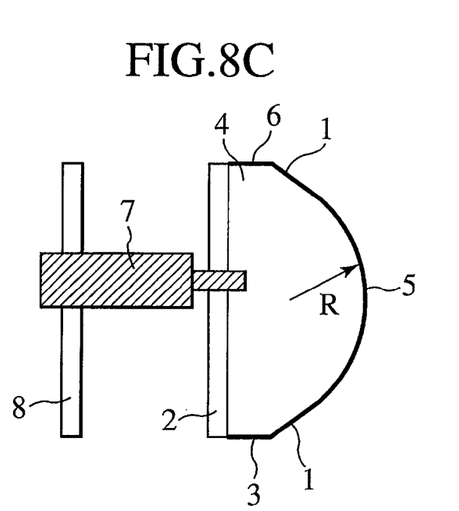
Figure 8D:
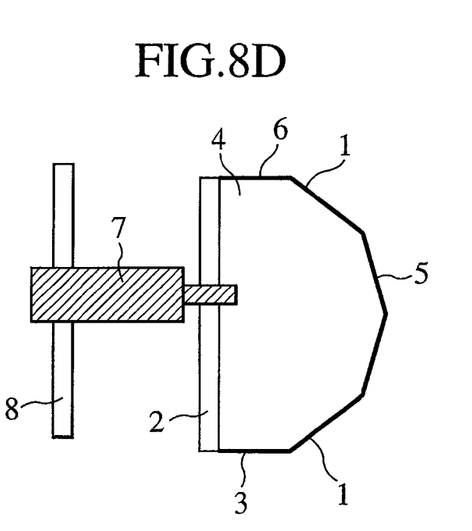

FIGS. 8A to 8D are top views illustrating further structural examples of the housing corners 1 based on FIGS. 6 and 7. In Embodiment 2 and thereafter, the same explanations as in Embodiment 1 are not provided. FIG. 8A illustrates a corner structure in which the curvature radii R at the corners 1 are each equal to or greater than 0.2 mm. FIG. 8B illustrates a corner structure in which the inner angles θ at the corners 1 are all equal to or greater than 125 degrees. FIG. 8C illustrates a corner structure in which the inner angles θ at the corners 1 are all equal to or greater than 125 degrees and the curvature radius of the curved third wall 5 is equal to or greater than 0.2 mm. FIG. 8D illustrates a corner structure in which five inner angles that are each equal to or greater than 125 degrees are provided between the first wall 3 and the second wall 6. In all the structures of FIGS. 8A to 8D, the first wall 3, the third wall 5, and the second wall 6 jointly form a substantially U-shaped horizontal cross-section. Note that the housing can take any form as long as the curvature radii R at the corners 1 are equal to or greater than 0.2 mm or the inner angles θ at the corners 1 are equal to or greater than 125 degrees.

Embodiment 3

Figure 9A:
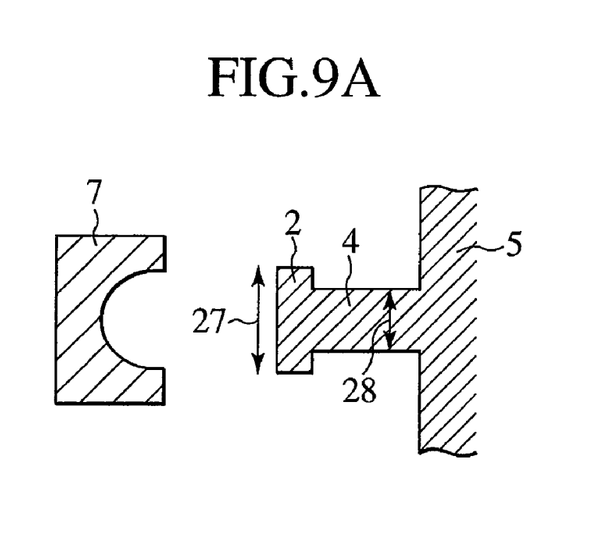
FIGS. 9A to 9D are diagrams illustrating Embodiment 3 of the invention.
Figure 9B:
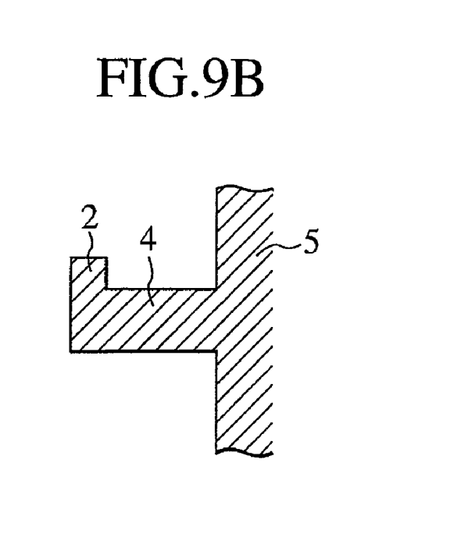
Figure 9C:
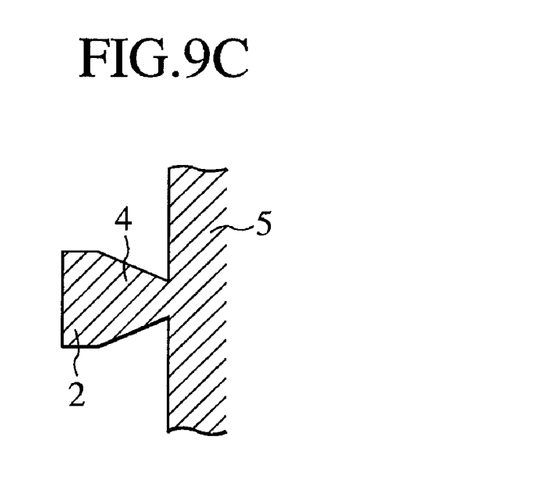
Figure 9D:
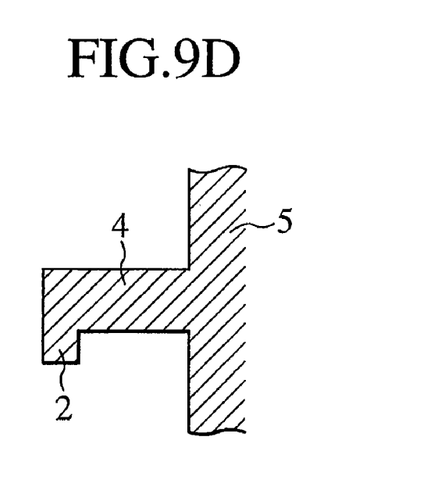

FIG. 9A is an enlarged cross-section taken along the line a-a' of FIG. 8A. FIGS. 9A to 9D illustrate housing structures in which the thickness 27 of the auxiliary shaft 2 is greater than the thickness 28 of the lubricant tray 4, and the lubricant tray 4 functions as a tray to retain lubricant. FIG. 9A illustrates a housing structure in which both of the upper end and lower end of the auxiliary shaft 2 vertically protrude from the lubricant tray 4. FIG. 9B illustrates a housing structure in which the upper end of the auxiliary shaft 2 protrudes upward from the lubricant tray 4. FIG. 9C illustrates a housing structure in which the thickness 28 of the lubricant tray 4 gradually increases toward the auxiliary shaft 2. FIG. 9D illustrates a housing structure in which the lower end of the auxiliary shaft 2 protrudes downward from the lubricant tray 4. Note that the housing corners 1 of Embodiment 3 can take any form as long as they are based on the test results of FIGS. 6 and 7 as in Embodiment 2.

Embodiment 4

Figure 10A:
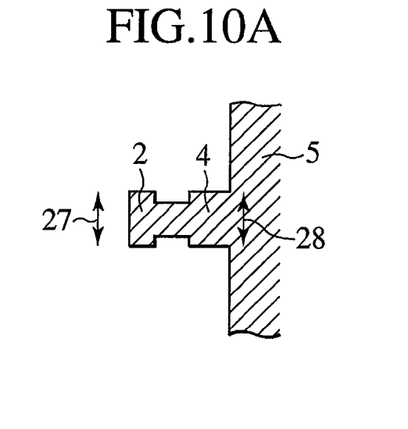
FIGS. 10A to 10E are diagrams illustrating Embodiment 4 of the invention.
Figure 10B:
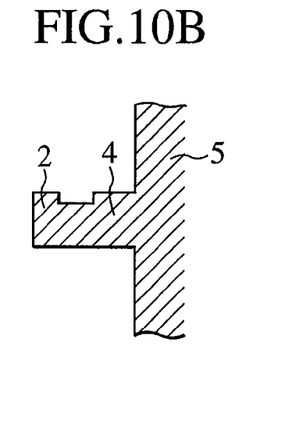
Figure 10C:
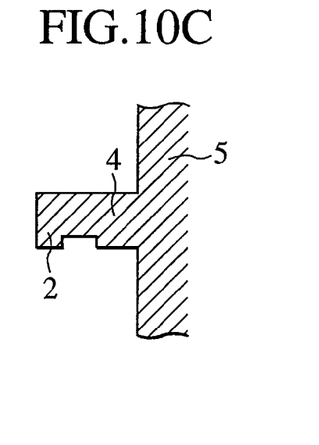
Figure 10D:
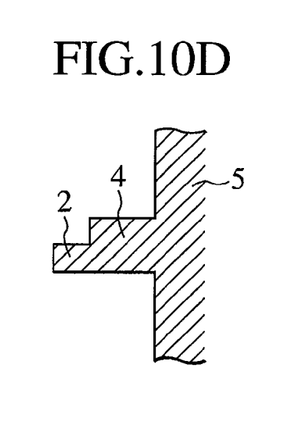
Figure 10E:
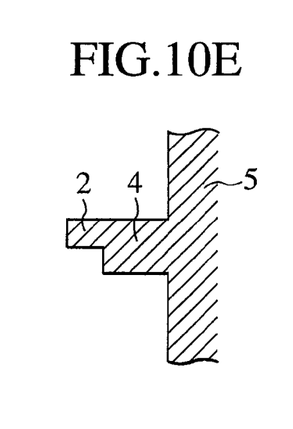

FIGS. 10A to 10E illustrate another embodiment of the invention and are enlarged cross-sections taken along the line a-a' of FIG. 8A. In each of FIGS. 10A to 10E, the thickness 27 of the auxiliary shaft 2 is equal to or less than the thickness 28 of the lubricant tray 4, and a shaft guide is provided. FIG. 10A illustrates a housing structure in which concave portions are provided on both the upper and lower sides of the lubricant tray 4 so that they function as a shaft guide. FIG. 10B illustrates a housing structure in which a concave portion, or a shaft guide, is provided on the upper side of the lubricant tray 4. FIG. 10C illustrates a housing structure in which a concave portion, or a shaft guide, is provided on the lower side of the lubricant tray 4. FIG. 10D illustrates a housing structure in which a concave portion, or a shaft guide, is provided on the upper side of the auxiliary shaft 2. FIG. 10E illustrates a housing structure in which a concave portion, or a shaft guide, is provided on the lower side of the auxiliary shaft 2. Note that the housing corners 1 of Embodiment 4 can take any form as long as they are based on the test results of FIGS. 6 and 7 as in Embodiment 2.

Embodiment 5

Figure 11A:
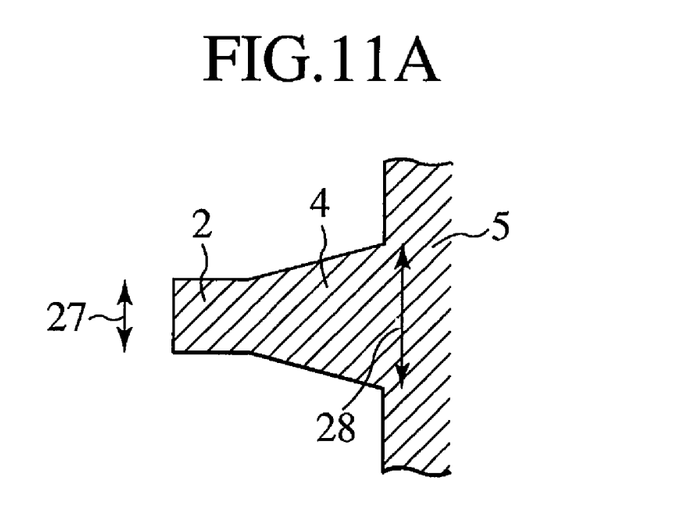
FIGS. 11A to 11C are diagrams illustrating Embodiment 5 of the invention.
Figure 11B:
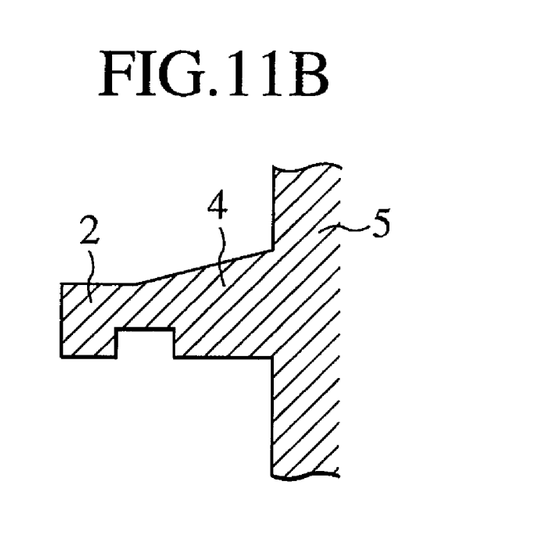
Figure 11C:
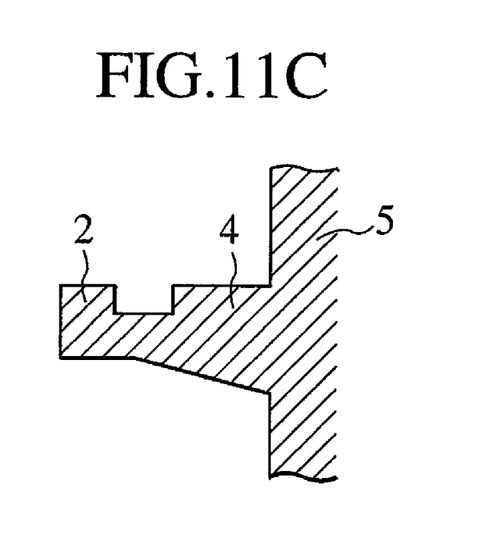

FIGS. 11A to 11C illustrate still another embodiment of the invention and are enlarged cross-sections taken along the line a-a' of FIG. 8A. In each of FIGS. 11A to 11C, the thickness 27 of the auxiliary shaft 2 is less than the thickness 28 of the lubricant tray 4, and a gentle slope leading to the auxiliary shaft 2 is provided at least either on the upper side or lower side of the lubricant tray 4 so that lubricant can effectively return to the auxiliary shaft 2. FIG. 11A illustrates a housing structure in which gentle slopes leading to the auxiliary shaft 2 are provided on both the upper and lower sides of the lubricant tray 4. FIG. 11B illustrates a housing structure in which a gentle slope leading down to the auxiliary shaft 2 is provided on the upper side of lubricant tray 4 and a concave portion, or a shaft guide, is provided on the lower side of the lubricant tray 4. FIG. 11C illustrates a housing structure in which a gentle slope leading to the auxiliary shaft 2 is provided on the lower side of lubricant tray 4 and a concave portion, or a shaft guide, is provided on the upper side of the lubricant tray 4. Note that the housing corners 1 of Embodiment 5 can take any form as long as they are based on the test results of FIGS. 6 and 7 as in Embodiment 2.

Embodiment 6

FIGS. 12A to 12F illustrate a further embodiment of the invention and are top views of housings based on the test results of FIGS. 6 and 7 in which the housings have vertically open spaces (the word "vertically" means that such spaces are open in a direction of a normal to the lubricant tray 4).

Figure 12A:
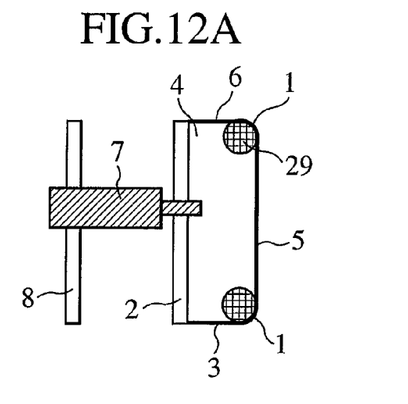
FIGS. 12A to 12F are diagrams illustrating Embodiment 6 of the invention.
Figure 12B:
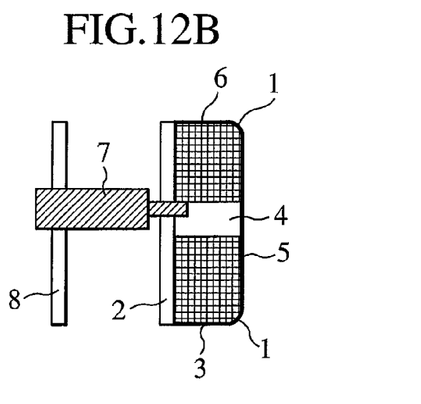
Figure 12C:
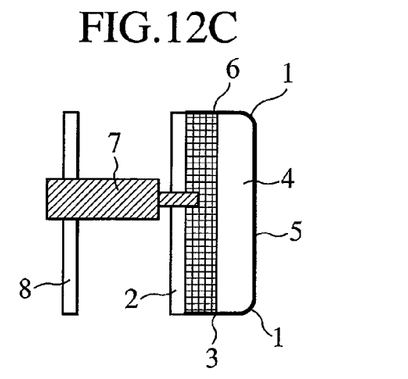
Figure 12D:
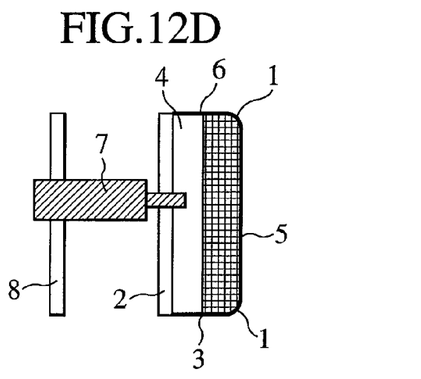
Figure 12E:
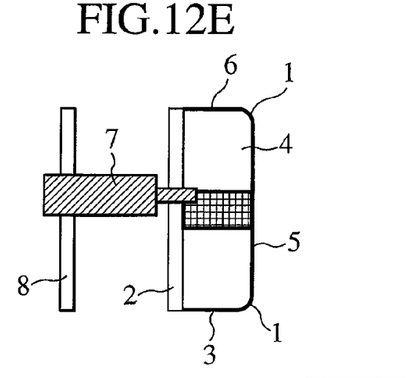
Figure 12F:
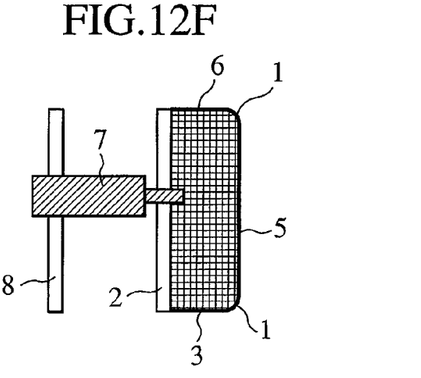

FIG. 12A illustrates a housing structure in which through holes 29 are provided in the portions of the lubricant tray 4 that are close to the corners 1. FIG. 12B illustrates a housing structure in which the lubricant tray 4 supports only the middle section of the auxiliary shaft 2. FIG. 12C illustrates a housing structure in which the auxiliary-shaft side of the lubricant tray 4 is vertically open. FIG. 12D illustrates a housing structure in which the third-wall side of the lubricant tray 4 is vertically open. FIG. 12E illustrates a housing structure in which the middle section of the lubricant tray 4 is vertically open. FIG. 12F illustrates a housing structure without the lubricant tray 4. Any structure of FIGS. 12A to 12F is sufficiently effective as long as the curvature radii or inner angles at the corners 1 are defined as in FIGS. 6 and 7.

While some of the housing corner shapes illustrated in FIGS. 8 and 12 (Embodiments 2 to 6) are somewhat angular, it is better to streamline such angular corners.

Further, while the housing structures of Embodiments 1 to 6 can be combined as desired, simply defining the curvature radii or inner angles at the corners 1 sufficiently serves the purpose of preventing lubricant from moving up the corners 1.

The above-mentioned various structures of the housing of an optical pickup device according to the invention, which are designed to prevent upward spread of lubricant, are intended primarily to be applied to a lens mover of an optical pickup device. However, their application is not limited thereto; the invention can also be applied, for example, to optical-element movers (such as mirror movers and the like), drive apparatuses, or any device that requires the use of lubricant.

What is claimed is:

1. An optical pickup device comprising:
   a housing;
   a light-emitting element that emits light;
   a light-receiving element that receives the light;
   a shaft to which a lubricant is applied; and
   an optical-component mounting member that is attached to the shaft in a movable manner and has an optical component;
   wherein the housing includes:
      three walls connected together whose horizontal cross-section is substantially U-shaped, a first wall of the three walls supporting one end of the shaft, a second wall of the three walls facing the first wall and supporting the other end of the shaft, a third wall connecting the first wall and the second wall; and
      a retainer plate provided so as to be surrounded by the three walls and the shaft, and
   wherein a radius of curvature formed on a horizontal cross-section of the three walls is larger than a radius of curvature formed between one of the three walls and the retainer plate.

2. The optical pickup device defined in claim 1, wherein the smallest radius of curvature formed on a horizontal cross-section of the three walls is larger than a radius of curvature formed between one of the three walls and the retainer plate.

3. The optical pickup device defined in claim 1, wherein the retainer plate is connected to the first, second, and third walls, and wherein the radius of curvature formed on a horizontal cross-section of the three walls is one formed between the first wall and the third wall.

4. The optical pickup device defined in claim 1, wherein the radius of curvature formed on a horizontal cross-section of the three walls is equal to or greater than 0.2 mm.

5. The optical pickup device defined in claim 1, wherein the radius of curvature formed between one of the three walls and the retainer plate is smaller at a location closer to the shaft than at a location farther away from the shaft.

6. The optical pickup device defined in claim 1, wherein the three walls, the retainer plate, and the shaft are integrally formed.

7. The optical pickup device defined in claim 1, wherein the thickness of the shaft is larger than the thickness of the retainer plate, and wherein the retainer plate serves as a lubricant tray.

8. The optical pickup device defined in claim 1, wherein a groove is provided on the retainer plate or on the shaft in a shaft-extending direction.

9. The optical pickup device defined in claim 1, wherein the thickness of the shaft is less than the thickness of the retainer plate.

10. The optical pickup device defined in claim 1, wherein the optical-component mounting member moves up to the proximity of the first wall and the proximity of the second wall.

11. The optical pickup device defined in claim 1, wherein the housing has an open space in a direction of a normal to the retainer plate.

12. The optical pickup device defined in claim 1, wherein the housing is made primarily from Zn, Mg, Al, or polyphenylene sulfide.

13. An optical pickup device comprising:
   a housing;
   a light-emitting element that emits light;
   a light-receiving element that receives the light;
   a shaft to which a lubricant is applied; and
   an optical-component mounting member that is attached to the shaft in a movable manner and has an optical component;
   wherein the housing includes:
      three walls connected together whose horizontal cross-section is substantially U-shaped, a first wall of the three walls supporting one end of the shaft, a second wall of the three walls facing the first wall and supporting the other end of the shaft, a third wall connecting the first wall and the second wall; and
      a retainer plate provided so as to be surrounded by the three walls and the shaft, and
   wherein an angle formed horizontally by two adjacent walls of the three walls is larger than an angle formed by one of the three walls and the retainer plate.

14. The optical pickup device defined in claim 13, wherein the smallest angle formed horizontally by two adjacent walls of the three walls is larger than an angle formed by one of the three walls and the retainer plate.

15. The optical pickup device defined in claim 13, wherein the retainer plate is connected to the first, second, and third walls, and wherein the angle formed horizontally by two adjacent walls of the three walls is one formed by the first wall and the third wall.

16. The optical pickup device defined in claim 13, wherein the angle formed horizontally by two adjacent walls of the three walls is equal to or greater than 125 degrees.

17. The optical pickup device defined in claim 13, wherein the angle formed by one of the three walls and the retainer plate is smaller at a location closer to the shaft than at a location farther away from the shaft.

* * * * *